Oct. 14, 1952     E. SOKOLIK     2,613,670
SANITARY VAGINAL APPLIANCE
Filed April 19, 1947
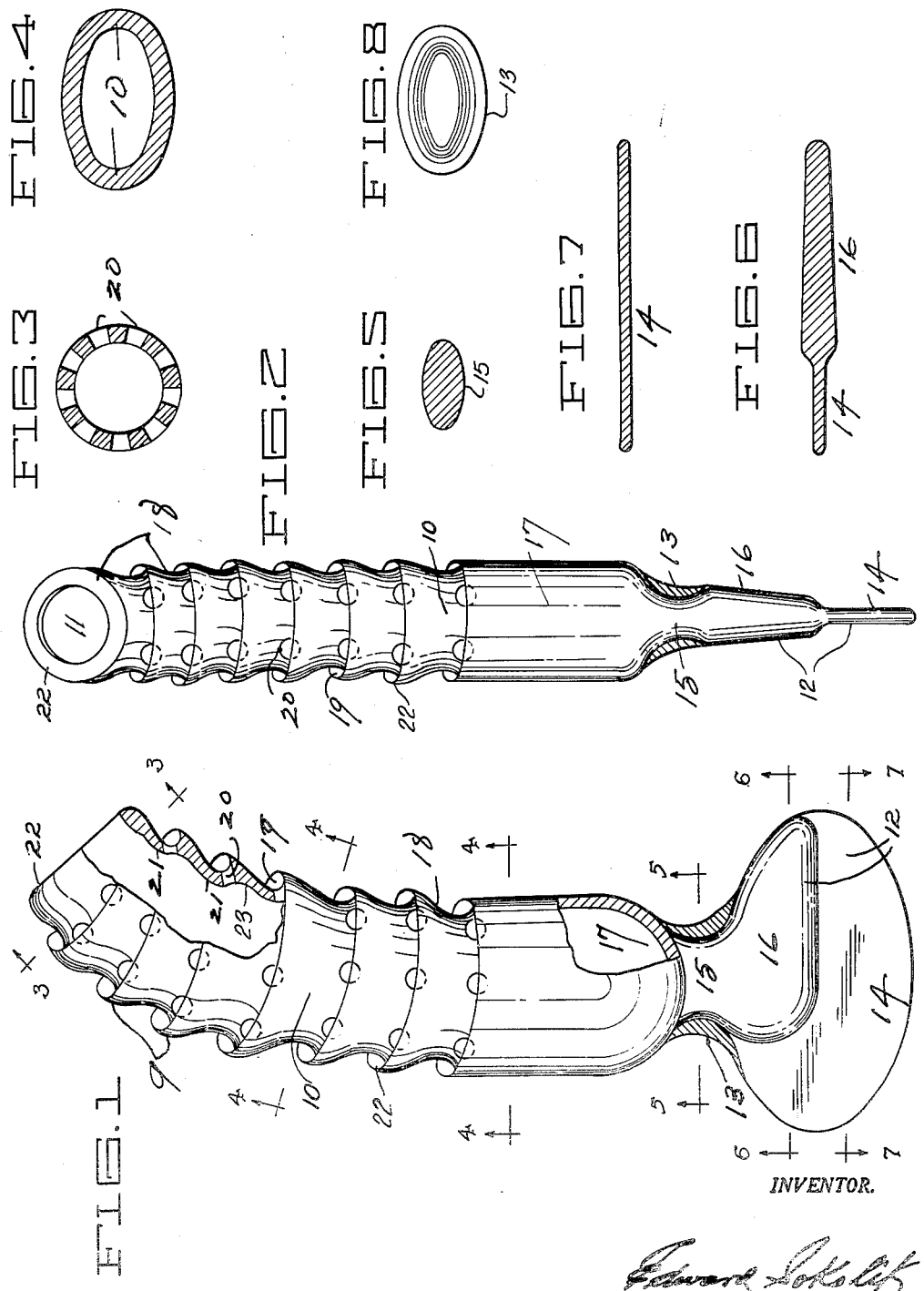
INVENTOR.

Patented Oct. 14, 1952

2,613,670

UNITED STATES PATENT OFFICE 2,613,670

SANITARY VAGINAL APPLIANCE

Edward Sokolik, New Brighton, Minn.

Application April 19, 1947, Serial No. 742,520

7 Claims. (Cl. 128—127)

My present invention is a catamenial and therapeutic pessary and one object of the invention is to provide a pessary to gather, trap and carry menstrual or suppurative uterine or vaginal exudations.

A further object of the invention is to carry absorbents and compresses to facilitate the therapy of feminine disorders.

A further object of the invention is to provide a pessary inherently adapted to support an abnormally disposed uterus.

Still another object of this invention is to provide a pessary that is resilient to anatomical flexions and non-compressibly collapsible in the vagina.

An important object is to provide a device that is adapted for comfortable, convenient and sanitary use thereof.

A further object is to provide a device that is adapted for repeated use thereof, is floatably self-retaining in the vagina and optionally provided with auxiliary facility for absorbing exudations descended to the vaginal sphincter.

Other objects and advantages of the invention will be apparent as the description proceeds.

Heretofore it has been the practice to use fibrous absorbents, applied optionally internally or externally. The disadvantages of the absorbent material were that they neither collected nor trapped the discharges, but merely retarded the filtration thereof, therethrough, and since the absorbent material is automatically collapsible or compressible, the discharge is wrung out and the absorbent material loses buoyancy or self-sustenance, when internally used. My device being tubularly formed of rubber or the like, is resilient and yielding, but non-collapsible or non-compressible, when under universal pressure of the tissues surrounding same.

The accompanying drawings form a part of this application, and like numerals are employed therein to designate like parts throughout the same.

Fig. 1 is a side elevation of the applicator, partly in section.

Fig. 2 is a front elevation thereof, partly in section.

Fig. 3 is a sectional view on line 3—3 of Fig. 1.

Fig. 4 is a sectional view on line 4—4 of Fig. 1.

Fig. 5 is a sectional view on line 5—5 of Fig. 1.

Fig. 6 is a sectional view on line 6—6 of Fig. 1.

Fig. 7 is a sectional view on line 7—7 of Fig. 1.

Fig. 8 is a plan view of the absorbent collar shown in section on line 5—5 of Fig. 1.

The embodiment of my invention is a resilient hollow barrel of rubber and the like, extending from the sphincter up to and against the uterus and provided with integrally appendant facility 12 depending from the bottom of the barrel, for conveniently applying and withdrawing the same. Such barrel is preferably conformed to the vaginal anatomy, leaning forwardly in the upper portion thereof and being preferably elliptic in cross-section for wearing comfort, and physically adapted to be floatably self-sustained in the vagina.

The device comprises three cooperative portions:

First, an upper exudation gathering wall 18, which is normally arcuate to conform to the shape of the vagina and which has an orifice 11 in the free end thereof adapted to induct the os externum uteri to gather the exudations therefrom directly. The rim of the free end of the upper annular wall 18, is preferably annularly converged and rounded to be comfortably seated in the cul-de-sac of the vagina (the wall of the barrel immediately subjacent to said rim, circumvallating the externum uteri preferably slightly spaced therefrom, thereby promoting comfort, hygiene, and therapy) and to facilitate vaginal application thereof. The exudation gathering annular wall 18 includes a plurality of annular ledges 9 alternating with annular recesses 10 and having substantially concave annular gutters 19, formed horizontally in the top surface thereof, and having at least one preferably oblique duct 20 formed therein, leading into the barrel. The ledges 9 and recesses 10 are preferably arranged and spaced in an upright column to gather uterine exudations that may have missed the orifice 11, or vaginal suppurations.

The ledges 9 have preferably a slightly convex circumferential surface merging with the concave top surface 19 thereof, forming arcuately upwardly tapering scavenging annular edge 22, whereby the vaginal application of the pessary is facilitated. Each recess 10 coextensive between each two adjacent scavenging edges 22, is in the shape of an S, inverted with the upper loop thereof abbreviated, and forming an inner surface of alternating receding waves 21 and outwardly bulging waves 23. Each of these annular recesses 10 affords a downwardly tapered wall surface automatically urging the pessary up to sustain itself and the uterus, and to yield accordion fashion to anatomical flexions and to adapt itself to support a more or less remote uterus. This upper annular wall 18 is adapted to carry absorbents or compresses for therapeutic purposes.

Second, a lower exudation trapping and storing annular wall or reservoir 17. The base of this reservoir 17 is tapering, whereby a function of buoyancy is imparted to the device to sustain itself above the vaginal sphincter, and whereby a function of resistance to collapsibility or compressibility thereof by the surrounding tissues bearing thereupon is maintained to thus prevent inadvertent vacating of the exudations stored therein. The reservoir 17 may be provided with displaceable therapeutic absorbent.

Third, a flattened grasping finger piece 12, integrally extended from the bottom of the reservoir 17 in a manner to afford comfort to the wearer. This appendant grasping finger piece 12, is preferably ear-shaped and includes preferably a thin flat grasping flap 14, a sphincteral neck 15, and a foot-shaped but flattened horizontal shank extension 16 of the sphincteral neck 15. This shank extension 16 is integral with the flap 14 and in use extends preferably forwardly to facilitate grasping thereof and to promote wearing comfort. The neck 15 and its shank extension 16 are of sufficient stock to facilitate the application of the pessary. The neck 15 is sufficiently constricted to receive an absorbent band 13 and still, together therewith, be preferably somewhat constricted. The flap 14 is adapted to be folded over onto the shank-extension 16 to permit the mounting of the absorbent band 13 onto the neck 15.

What I claim is:

1. In a catamenial and therapeutical pessary comprising a vaginal tubular barrel formed of resilient material such as rubber, extending between the sphincter and the cul-de-sac, and having, in the upper end thereof, an orifice adapted to induct the externum uteri and a reservoir for uterine exudations, formed in the lower portion of said barrel, said lower portion having the closed end thereof converged—an improved barrel comprising a series of integrally interconnected band portions of the barrel, formed in the portion of the barrel disposed above the reservoir, each band portion having a periphery of the shape of an S, inverted, and abbreviated in the upper loop thereof, and consisting, commencing at the bottom of each band; of an annular horizontally disposed scavenging edge; an annular horizontally disposed gutter having substantially a concave base merging into the scavenging edge and adapted to gather therefrom exudations, not gathered by the orifice, and scavenged by said edge, said gutter having one or more drain ducts leading into the barrel; an annular web connecting the gutter with the scavenging edge of the next superposed band-portion, each annular web having an upper diameter exceeding the lower diameter thereof, forming the wall of the upper portion of the barrel, undulated, whereby accordion fashion resiliency of said upper portion, is attained, and the gathering of the exudations, facilitated, by virtue of the vaginal tissues being permitted to bulge in over the scavenging edge, and inherently urging the pessary upwardly by bearing against the downwardly and inwardly slanted periphery of each web, thereby contributing as a support for a displaced uterus and maintaining the externum uteri in the orifice of the barrel.

2. The structure defined in claim 1 in which the upper end of the barrel is slightly annularly converged toward the orifice formed therein for permitting the pessary to be vaginally introduced with facility.

3. The structure defined in claim 1 in which the upper portion of the barrel is deflected to vaginal conformity.

4. The structure defined in claim 1 in which the barrel is substantially of uniform transverse extent.

5. The structure defined in claim 1 in which the barrel is elliptical in cross-section.

6. The structure defined in claim 1 in which the scavenging edge is in the form of an acute angle uprightly disposed.

7. The structure defined in claim 1 in which the barrel is provided with one or more of such accordion fashion resilient band portions adapted to gather feminine exudations on any portion of the barrel above the reservoir.

EDWARD SOKOLIK.

REFERENCES CITED

The following references are of record in the file of this patent:

UNITED STATES PATENTS

| Number | Name | Date |
|---|---|---|
| 74,482 | Atkinson | Feb. 18, 1868 |
| 1,241,652 | Norquist | Oct. 2, 1917 |
| 1,982,001 | Haas | Nov. 27, 1934 |

FOREIGN PATENTS

| Number | Country | Date |
|---|---|---|
| 271,657 | Germany | Mar. 17, 1914 |
| 364,087 | Germany | Nov. 17, 1922 |
| 385,401 | Germany | Dec. 6, 1923 |
| 589,399 | Germany | Dec. 9, 1933 |
| 756,127 | France | Dec. 5, 1933 |
| 786,989 | France | Sept. 14, 1935 |